(12) United States Patent
Lichter et al.

(10) Patent No.: US 11,345,417 B2
(45) Date of Patent: May 31, 2022

(54) MODULAR TAIL ASSEMBLY FOR A MOTOR VEHICLE

(71) Applicant: Ford Global Technologies, LLC, Dearborn, MI (US)

(72) Inventors: Martin Lichter, Erftstadt (DE); Hauke Weber, Cologne (DE); Armando Lopes dos Santos, Cologne (DE); Simone Breuer, Langenfeld (DE); Raja Raghava Sreepathy, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 16/876,489

(22) Filed: May 18, 2020

(65) Prior Publication Data

US 2020/0369328 A1  Nov. 26, 2020

(30) Foreign Application Priority Data

May 21, 2019  (DE) .......................... 102019207398.0

(51) Int. Cl.
  *B62D 33/03*   (2006.01)
  *B62D 33/037*  (2006.01)
  (Continued)

(52) U.S. Cl.
  CPC ................ *B62D 33/03* (2013.01); *B60R 5/04* (2013.01); *B62D 25/08* (2013.01); *B62D 27/065* (2013.01);
  (Continued)

(58) Field of Classification Search
  CPC ...... B62D 33/03; B62D 25/08; B62D 27/065; B62D 33/0276; B62D 33/037; B60R 5/04; B60J 5/103
  (Continued)

(56) References Cited

U.S. PATENT DOCUMENTS 7,503,619 B2 * 3/2009 Werner .................. B60J 1/1884
                                                       296/106
7,524,156 B2   4/2009 Garbes
                   (Continued)

FOREIGN PATENT DOCUMENTS

DE   19522296    1/1997
DE   10203538    8/2003
                   (Continued)

OTHER PUBLICATIONS

German Search Report for Application No. 102019207398.0 dated Mar. 25, 2020.
                   (Continued)

*Primary Examiner* — D Glenn Dayoan
*Assistant Examiner* — Dana D Ivey
(74) *Attorney, Agent, or Firm* — Vichit Chea; Carlson, Gaskey & Olds, P.C.

(57) ABSTRACT

A modular tail assembly for a motor vehicle can include a tail-side frame element and a tailgate. The frame element is configured to form a part of a tail-side vehicle frame and be detachably fastened to another part of the vehicle frame. A motor vehicle can include the modular tail assembly. The motor vehicle has a vehicle body which is formed so that a cargo tray is arranged in the region of a tail-side vehicle trunk. The modular tail assembly can facilitate easier and quicker tail-side loading of a motor vehicle and can increase the storage space available for loading within a motor vehicle.

19 Claims, 3 Drawing Sheets

(51) Int. Cl.
*B62D 33/027* (2006.01)
*B62D 25/08* (2006.01)
*B62D 27/06* (2006.01)
*B60R 5/04* (2006.01)

(52) U.S. Cl.
CPC ....... *B62D 33/0276* (2013.01); *B62D 33/037* (2013.01)

(58) Field of Classification Search
USPC ...................................................... 296/57.1
See application file for complete search history.

(56) References Cited

U.S. PATENT DOCUMENTS

| | | | |
|---|---|---|---|
| 9,994,263 B1* | 6/2018 | Richter | B60P 1/435 |
| 2018/0257537 A1* | 9/2018 | DeSimone | B60P 1/435 |

FOREIGN PATENT DOCUMENTS

| | | |
|---|---|---|
| DE | 60115518 | 7/2006 |
| DE | 102008027553 | 12/2009 |
| JP | 2001047927 | 2/2001 |

OTHER PUBLICATIONS

Dritte Generation des BMW X5, retrieved from https://www.sueddeutsche.de/auto/bmw-x5-50i-fern-von-fortschritt-1.1760314, dated Sep. 9, 2013.

* cited by examiner

MODULAR TAIL ASSEMBLY FOR A MOTOR VEHICLE

CROSS-REFERENCE TO RELATED APPLICATIONS

This application claims priority to DE Patent Application No. 102019207398.0, which was filed on 21 May 2019 and is incorporated herein by reference in its entirety.

TECHNICAL FIELD

The present disclosure relates to a motor vehicle modular tail assembly that includes a tail-side frame element and a tailgate. More particularly, the disclosure relates to the frame element forming a part of a tail-side vehicle frame and being detachably fastenable to another part of the tail-side vehicle frame.

BACKGROUND

Motor vehicles generally have on their tail-side a loading opening via which cargo can be loaded into and unloaded from a trunk region of the motor vehicle. The loading opening can extend almost over the entire region of the vehicle tail and be closed off with a tailgate. In order to move the tailgate from a closed position into an open position and vice versa, the tailgate can be mounted pivotably on the vehicle. A locking mechanism can furthermore be provided between the tailgate and the tail region of the motor vehicle. The tailgate can be securely locked and closed off by the locking mechanism. For this purpose, a corresponding locking element is generally provided both on the tailgate and the vehicle body. Both locking elements interact when the tailgate is in the closed position. Tailgates can in principle be formed in one piece or several pieces.

Many vehicle types have in their tail region a trunk which is accessible via the loading opening. A trunk base is generally arranged on a higher vertical level than the vehicle underbody. An additional storage space is often provided between the trunk base which provides the actual cargo surface and the vehicle underbody, for example, for storing a spare tire. Even in the case that no spare tire is stored in the gap between vehicle underbody and trunk base (and the gap is thus in principle available for storing cargo), the use of this additional gain in space may be unsuitable as storage space in the case of day-to-day loading and unloading processes. This applies all the more to the loading and unloading of heavy loads. This is due to the fact that the gap which lies between vehicle underbody and trunk base is delimited in the vehicle tail region by a positionally fixed bumper and/or a vehicle cladding. This means that a load (for example, a piece of luggage) must be conveyed (e.g. lifted) for positioning in the gap over the bumper or the vehicle cladding in order to arrive at the lower vertical level of the gap in relation to the upper side of the bumper. This seems to be impracticable in particular for pieces of luggage of a higher weight, which is why the storage space located below the trunk base is generally not used for routine loading and unloading processes.

A standard bumper installed in the tail region of vehicles, or the lower part of the body which surrounds the tail opening, is generally integrated in one piece into a tail frame which delimits the vehicle tail opening and is thus to be assigned directly to the vehicle body.

With reference to FIG. 1, a prior art vehicle tail of a motor vehicle 102 is reproduced in a top view of the tail region. The prior art motor vehicle 102 generally has, in the tail region, a loading opening O1, which is delimited by a rigid tail-side vehicle frame 105. The motor vehicle 102 has a conventional trunk base 112. The vehicle frame 105 is part of the vehicle body and is generally a one-piece component. The loading opening O1 can be closed off by a tailgate (not represented). It is known to use one-piece or two-piece tailgates, wherein the tailgates are generally mounted pivotably on vehicle frame 105.

SUMMARY

Exemplary embodiments of the present disclosure provide a modular tail assembly for a motor vehicle with which tail-side loading of a motor vehicle can be performed more easily and quickly and the storage space accessible for loading a motor vehicle is increased in size. Some of the embodiments provide a motor vehicle where tail-side loading of a motor vehicle can be performed more easily and quickly and the storage space accessible for loading the motor vehicle is increased in size.

A modular tail assembly for a motor vehicle according to an exemplary aspect of the present disclosure includes, among other things, a tail-side frame element and a tailgate. The frame element can be configured to form a part of a tail-side vehicle frame and to be fastened detachably to the vehicle frame. The tail-side vehicle frame can extend about an entire circumferential perimeter of a loading opening such that the tail-side vehicle frame encircles the loading opening.

In principle, the modular tail assembly can be installed in vehicles with different tail forms irrespective of whether this involves a notchback, a fastback or a hatchback. The shape of the tail can depend on the respective vehicle type.

Notchbacks are found in most motor vehicles above the compact class. In the case of motor vehicles with such a notchback, the trunk can be set apart from the passenger compartment and can form a notch toward an upper portion of the vehicle. A bulkhead or a cross strut under the C columns stiffens the self-supporting body. Vehicles with a notchback involve, among other things, a three box design, in the case of which the front, passenger compartment and tail in each case resemble a box.

In SUVs, a fastback is generally provided. In the case of a fastback, the tail can drop directly behind the first or second row of seats of the passenger compartment with an approximately constant gradient from the upper portion of the vehicle down to the rear termination of the body. In contrast to this, hatchbacks have a rear surface which runs approximately vertically.

The vehicle body (which can also synonymously be referred to as a vehicle frame) can have a minimum stiffness. The vehicle body can be suitable for discharging vibrations of the vehicle engine in order to minimize discomfort in the passenger compartment. Fully closed vehicle bodies or vehicle bodies manufactured in one piece with profiles which are as round as possible can have particularly high rigidity values. In relation to the vehicle tail region, some motor vehicles, particularly those with a fastback or hatchback, can provide a tail-side vehicle frame which delimits a loading opening or trunk opening which can be closed with a tailgate. In general, a tail-side vehicle frame of such vehicles is manufactured in one piece and forms a part of the vehicle body.

At the same time, such a vehicle frame defines with its lower frame side the approximate vertical position of the trunk base. In the case of many vehicles, an additional storage space (for example, for a spare wheel, dressings, vehicle tool, etc.) is provided below the trunk base. The storage space is therefore arranged in a gap between the trunk base and the vehicle underbody. As a result of the higher vertical level of the lower frame side in the vertical direction, the gap is generally not suitable for loading heavy pieces of luggage. This is because, in order to load or unload a piece of luggage into the stated gap, the piece of luggage must be lifted beyond the lower frame side of the tail-side vehicle frame, which may be difficult especially for heavy or unwieldy loads.

Again, a modular tail assembly according to an exemplary aspect of the present disclosure can include a tail-side frame element that forms a part of the tail-side vehicle frame and can be fastened detachably to the vehicle frame. In contrast with other designs, the one-piece tail-side vehicle frame is modified such that the lower frame side is replaced by a separate frame element which can be connected via suitable connecting elements (for example, screw connections) to the tail-side vehicle frame.

In the case of a corresponding configuration, the stated frame element enables easy accessibility to a gap located below the trunk base in relation to the vertical level during loading or unloading. The lower side known as the tail-side vehicle frame can therefore be lowered.

The modular tail assembly can help to maintain a minimum rigidity of the vehicle frame. The modularity facilitates accommodating particular customer wishes. As a result of the detachable connectivity of the lower frame element to the tail-side vehicle frame, a replacement of the frame element is furthermore facilitated in the event of damage. The tailgate as part of the modular tail assembly can be configured as the only tailgate which closes the tail opening. In particular, within the meaning of the present disclosure, a tailgate is, however, the lower tailgate of a tailgate formed in two pieces.

In another exemplary embodiment of the foregoing modular tail assembly, the frame element can be formed to be U-shaped and to have a center portion extending transverse to the longitudinal direction of the vehicle. An end portion is disposed at both ends of the center portion. The end portions are arranged at an angle to the center portion. The center portion provides the base of the U-shape, while the end portions form the limbs of the U-shape. In this context, the term angular arrangement refers to the fact that the end portions are arranged in each case perpendicular to the center portion. Equally, however, an angle which deviates by 90° can also be present between the end portions and the center portion as long as an angular arrangement is ensured. In particular, the angle can lie in a range from 70° to 110°. The end portions and the center portion can be manufactured as a one-piece component and form such a component, for example, as a cast or molded part. The frame element can be manufactured from different materials such as steel, sheet metal, high-strength plastic, composite materials, etc. In relation to the cross-section, various shapes are considered for the configuration of the center portion and the end portions, for example, the portions can have a round or flattened (e.g. rectangular) cross-section. The center portion can also have a cross-sectional form which differs from the end portions. The end portions can additionally have a fastening flange at their upper ends, i.e. at their end facing away from the center portion. The fastening flange can be flange-mounted at an angle of approximately 90° to the respective end portions. Openings can be formed on the fastening flanges (as also on the center portion or the end portions), via which openings of the frame element can be fastened to the tail-side vehicle frame or the vehicle body.

The U-shaped formation of the frame element can enable lowering of the lower frame element and arrangement on a higher vertical level (e.g. at the height of the trunk base and not at the height of the vehicle underbody). Depending on the concrete formation of the frame element, different height levels of the frame element (in relation to the vertical height) can be set. Pieces of luggage or transport goods can easily be loaded over a frame element lowered in such a manner into the trunk or into a gap which is located below the normal trunk height level (between trunk base and vehicle underbody).

In another exemplary embodiment of any of the foregoing modular tail assemblies, the tailgate can be configured to pivot about a pivot axis. The pivot axis can run transverse to the longitudinal direction of the vehicle and is arranged at the height of the center portion. The indication "at the height of the center portion" refers to the vertical level of the pivot axis and of the center portion. The pivot axis can, however, simply also be arranged at a slight height offset to the center portion. The pivot axis can also be a component of the modular tail assembly. The frame element which can be fastened to the tail-side vehicle frame is, however, in the mounted state, not arranged so as to be able to pivot out, rather in a positionally fixed manner. As a result of the arrangement of the pivot axis substantially at the same height as the center portion of the frame element, the pivot axis does not hinder a simple loading and unloading process via the tail-side vehicle opening. The pivot axis can be formed in the form of a pivot rod extending along the vehicle transverse axis, but also in the form of pivot stubs which are fastened or molded on the vehicle body, and which engage in corresponding bearing receptacles of the tailgate. Such stubs can equally, however, also be formed on the tailgate and engage in chassis-side bearing receptacles. Alternative configurations for the formation of pivot bearings can also be used.

In another exemplary embodiment of any of the foregoing modular tail assemblies, the tailgate can be configured to be opened by way of a combined translational and pivoting movement. This means that the tailgate initially performs a translational sliding movement prior to the actual pivoting out, for example, a vertical movement. A pivoting-out movement is only performed thereafter. This can be provided, for example, via a multi-joint mechanism.

The fact that the tailgate used in the context of the tail assembly according this embodiment is pivoted out during opening enables a subsequent closing process of the tailgate to be performed significantly more conveniently for a user. In contrast to tailgates which are formed to pivot up (the pivot axis is located in this case at the upper frame end, with the exception here of notchbacks), in the case of which one has to grip far upward (even overhead) for closing again, the configuration can help persons with a smaller body size to easily open and close the tailgate. Insofar as the tailgate according provides the lower part of a two-piece tailgate, the vehicle can already be loaded by simply opening the lower tailgate, i.e. both tailgate parts do not necessarily have to be opened for loading and unloading.

Another exemplary embodiment of any of the foregoing modular tail assemblies can include at least one of the following components: a bumper, a cladding body, a seal arrangement, at least one light source, a sensor element (for example, a distance sensor), and a locking mechanism for locking the tailgate on the motor vehicle. The bumper can, however, already be formed by the frame element so that an additional bumper does not necessarily have to be integrated into the tail assembly.

In this context, it should be emphasized that the entire assembly can also be regarded as a bumper, i.e., as a component, which absorbs energy in the event of an impact load being applied to the vehicle. The term cladding body refers to the outer cladding of the vehicle which surrounds the further components of the assembly from outside. The cladding body can comprise several components or be manufactured in one piece. It can be manufactured in particular from metal and/or plastic. In this context, the term seal arrangement refers to all the seals which are provided between the components of the modular tail assembly as well as those seals which are provided between the components of the tail assembly and the vehicle frame or further components of the vehicle. Seals are components with which openings or gap openings between several components can be closed off in a moisture-impervious, airtight and/or noise-impervious manner. Of course, such seals can, however, be formed only to be moisture-impervious and at the same time permeable for air or gasses. Openings with seals cannot generally be closed off in an entirely noise-impervious manner, this primarily involving a noise-reducing seal. Seals can therefore be formed in a thermal- and noise-insulating manner.

As already mentioned, the tail assembly can comprise light sources (for example, a rear light, indicator, etc.). The modular tail assembly can furthermore have the electric lines or contacts required for the supply of energy to the light sources. A wide range of types of sensor elements can also be integrated into the tail assembly, for example, distance sensors. Speed sensors or acceleration sensors are also considered as sensor elements. A camera unit (e.g. a reversing camera) can also be integrated into the tail assembly. The stated list is not conclusive. The term locking mechanism refers to the fact that suitable locking elements are integrated into the tail assembly or the tailgate, which enables a locking of the tail assembly or tailgate on the vehicle body or an upper tailgate (in the case of a two-piece tailgate).

In another exemplary embodiment of any of the foregoing modular tail assemblies, the tail assembly forms an assembly which is composed of several modules. The individual modules or components can have in each case fastening elements or fastening regions via which they can be connected to further modules or components. The fastening elements or fastening regions can be selected or configured such that the modules can be dismounted or mounted in a modular manner. A simple replacement is thus enabled in the case of a component defect.

In another exemplary embodiment of any of the foregoing modular tail assemblies, the tailgate forms a ramp in its pivoted-out position. The ramp forms, in the sense of a loading ramp, a connection between the vehicle interior (in the tail region) and a carriageway surface. Cargo can be easily moved and loaded via the ramp into the storage space or tail-side trunk. The ramp can be composed of at least two ramp elements which can be displaced telescopically relative to one another to the ramp elements can jointly form a part of the tailgate or can be integrated into it.

As a result of the telescopic formation, the ramp can be stowed or accommodated in a space-saving manner in the tailgate. Moreover, the length of the ramp is not restricted to the size of the tailgate, as a result of which a desired inclination of the ramp in the folded-out state can be adjusted flexibly. In order to ensure the telescopic formation, one of the ramp elements can have, for example, an inner cavity in which a second ramp element can be received. The second ramp element can have a correspondingly smaller dimensioning. Alternatively, the tail flap can also have an inner cavity in which at least one ramp element can be stowed in the non-extended state. The ramp element can be extended by way of a telescopic displacement movement with respect to the tailgate. The ramp elements can have locking elements in order to avoid an undesired displacement of the ramp elements.

In another exemplary embodiment of any of the foregoing modular tail assemblies, the ramp can comprise a device for easier loading of loads. Devices for easier loading can be, for example, guide elements formed on the ramp. The term guide element can refer, for example, to a rail arrangement via which roller-based loads can be loaded or unloaded. The term load can refer in this context to any desired transport good or transport container, for example, cases, roller container or transport boxes (this list is not conclusive). The term load can equally also, however, refer to drawers or drawer systems. These can be embodied, for example, to be rail- or roller-based.

In another exemplary embodiment of any of the foregoing modular tail assemblies, a motor vehicle can include the modular tail assembly. In principle, such a motor vehicle can include a vehicle body which is formed such that a cargo tray is arranged in the region of a tail-side vehicle trunk. The cargo tray is preferably arranged below a base surface of the vehicle trunk. The cargo tray has a cargo tray base which is fully delimited with respect to the vehicle by a wall—apart from a tray side which faces the vehicle tail. At the tail-side, the cargo tray base terminates flush with the center portion of the frame element, therefore lies on approximately the same vertical level. The cargo tray can be integrated into the base of the vehicle body or provide a part of the vehicle body. As a result of such a configuration, the trunk volume of the vehicle is significantly increased and loading processes are simplified.

In another exemplary embodiment of any of the foregoing modular tail assemblies, the cargo tray can be fastened detachably to the vehicle body. To this end, fastening flanges angled toward a side wall of the cargo tray can be provided in an angled manner in the upper region of the tray, via which fastening flanges the cargo tray can be mounted on fastening regions provided on the vehicle side. The fastening flanges can have fastening openings or fastening means which interact with associated vehicle-side fastening openings or fastening means and can provide a fastening of the cargo tray to the vehicle. For example, the cargo tray can be screwed on the vehicle. As a result of the detachable fastening of the cargo tray, the cargo tray can be replaced where necessary. In principle, detachable fastenings enable significantly lower cost and quicker repairs and rapid replacement. The cargo tray can in principle be manufactured from plastic, metal or composite materials.

In another exemplary embodiment of any of the foregoing modular tail assemblies, at least one encompassing element, which is of nominally identical design to the basic form of the frame element, is arranged below the cargo tray and is fastened with its end portions to the vehicle body. Such an encompassing element can reinforce the retention of the cargo tray and thus the fastening of the cargo tray to the vehicle body. If an impact load is applied to the vehicle, energy can additionally be absorbed and discharged via the encompassing element so that the encompassing element can also take on energy-absorbing tasks in the region of the vehicle tail. The encompassing element can also enable heavier loads to be transported in the cargo tray. In some examples, several encompassing elements are provided for holding and fastening the cargo tray. As already indicated, the encompassing element encompasses the cargo tray on its underside. The encompassing element can furthermore also encompass a part of a cargo tray wall region adjoining the cargo tray base. The encompassing element can bear directly against the cargo tray. In particular, the encompassing element can bear with its center portion extending transverse to the longitudinal direction of the vehicle against an underside of the cargo tray which faces a driving or stationary ground surface.

To avoid unnecessary duplication of effort and repetition of text in the specification, certain features are described in relation to only one or several aspects or embodiments. However, it is to be understood that, where it is technically possible, features described in relation to any aspect or embodiment may also be used with any other aspect or embodiment.

BRIEF DESCRIPTION OF THE FIGURES

Further advantages, configurations and further developments which are related to the modular tail assembly according to this disclosure or the motor vehicle according to the disclosure are explained in greater detail on the basis of the exemplary embodiments described below. The features described on the basis of the exemplary embodiments can also be called on for the further development of the modular tail assembly according to this disclosure and also the motor vehicle according to this disclosure. The exemplary embodiments are explained in greater detail on the basis of the following figures.

DETAILED DESCRIPTION

Figure 1:
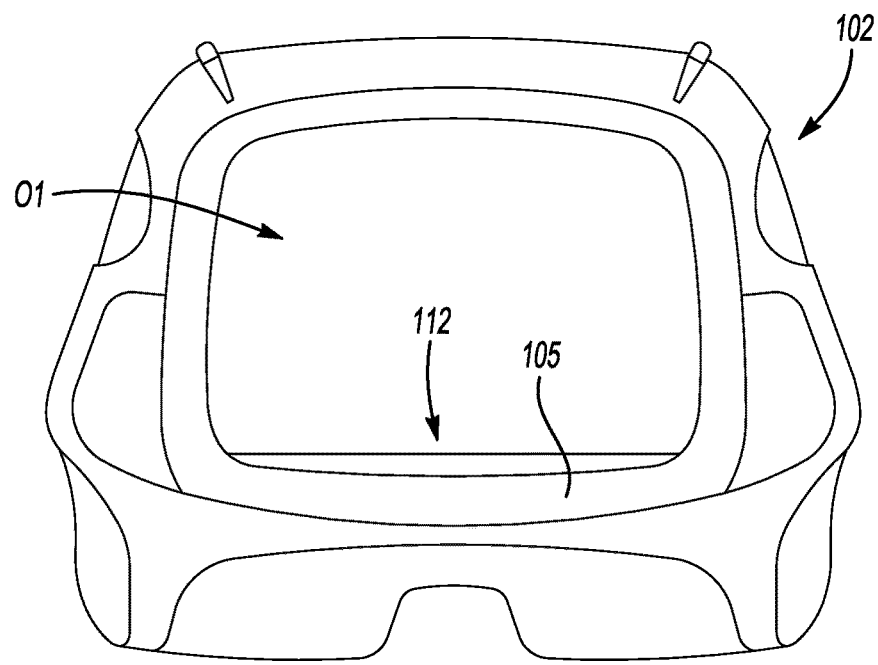
FIG. 1 shows a schematic representation of a typical vehicle tail known from the prior art including tail frame in a rear view.
Figure 2:
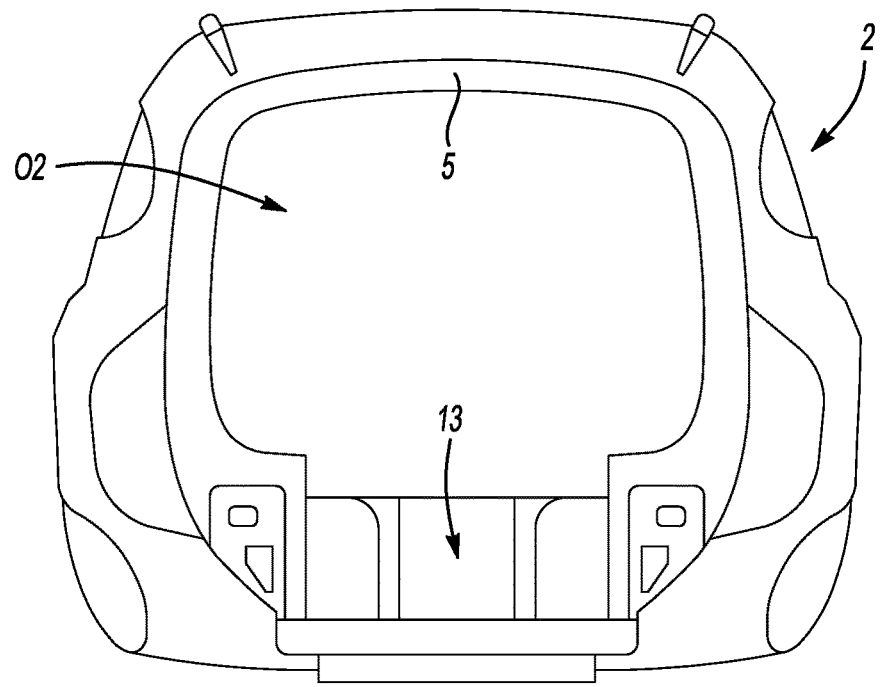
FIG. 2 shows a schematic representation of a vehicle tail according to an exemplary embodiment of the present disclosure.
Figure 3:
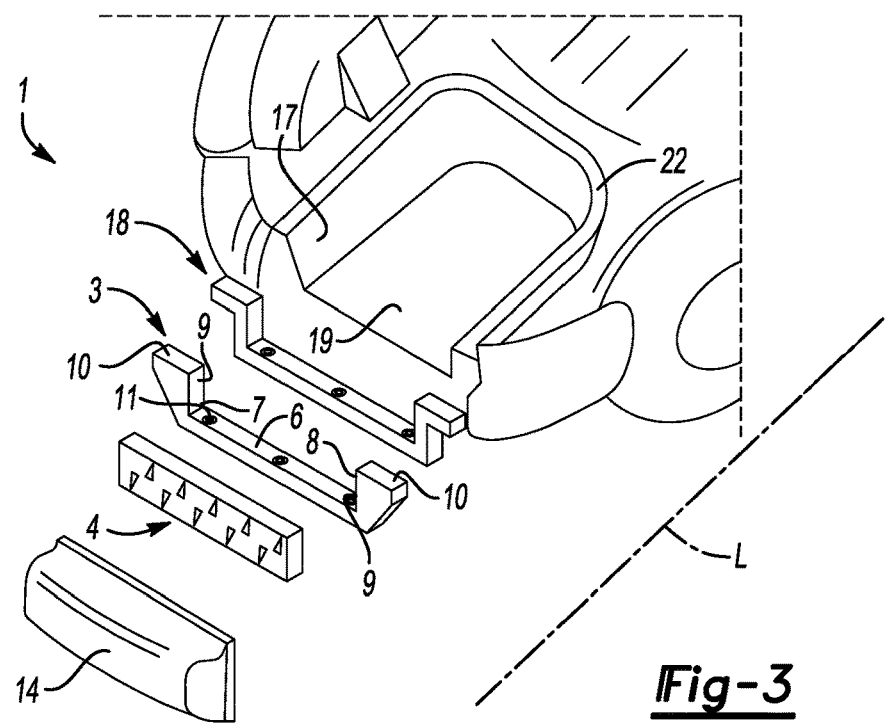
FIG. 3 shows an exploded representation of a vehicle tail and of the modular tail assembly of FIG. 2.

With reference to FIGS. 2 and 3, an exemplary embodiment of the present disclosure includes a modular tail assembly 1 of a motor vehicle 2. The modular tail assembly 1 has a tail-side frame element 3 that forms a part of tail-side vehicle frame 5 and can be fastened detachably to another part of the vehicle frame 5. In comparison with the prior art motor vehicle 102 reproduced in FIG. 1, the lower part of frame 5 is disposed at a lower vertical height level.

In contrast to the prior art shown in FIG. 1, the one-piece, tail-side vehicle frame 5 has been amended such that the lower frame side is replaced by a separate frame element 3 which can be connected via suitable connecting elements (for example, screws 11) to tail-side vehicle frame 5.

As a result of this, easier accessibility of a gap 13 which lies below trunk base (of a traditional vehicle) in relation to the vertical level is enabled during loading or unloading. The lower side of tail-side vehicle frame 5 is therefore lowered relative to the prior art vehicle 102 of FIG. 1. As a result, loading opening O2 is also increased in size in comparison with the prior art motor vehicle 102 of FIG. 1.

A replacement of frame element 3 in the event of damage (for example, as a result of an impact load) is facilitated as a result of the detachable connectivity of lower frame element 3 to tail-side vehicle frame 5.

As represented, for example, in FIG. 3, frame element 3 is formed to be U-shaped. In this case, it has a center portion 6 which extends transverse to longitudinal direction of the vehicle L, at both ends 7, 8 of which center portion 6 in each case an end portion 9 arranged at an angle to center portion 6 is provided. Center portion 6 provides the base of the U-shape, while end portions 9 form the limbs of the U-shape. According to the present figure-based representation, end portions 9 are arranged at an angle (for example, perpendicular) to center portion 6. End portions 9 additionally have at their upper ends, i.e. at their ends facing away from center portion 6 fastening flanges 10 which—as represented in the present case—are flange-mounted, for example, at an angle of 90° onto end portions 9. Fastening flanges 10 (as also center portion 6 or end portions 9) can have openings via which frame element 3 can be fastened to tail-side vehicle frame 5 or the vehicle body. Fastening can be carried out e.g. via screws 11. As FIG. 3 also shows, modular tail assembly 1 furthermore has a cladding body 14 which surrounds the tail assembly 1 at least partially from the outside.

Figure 4:
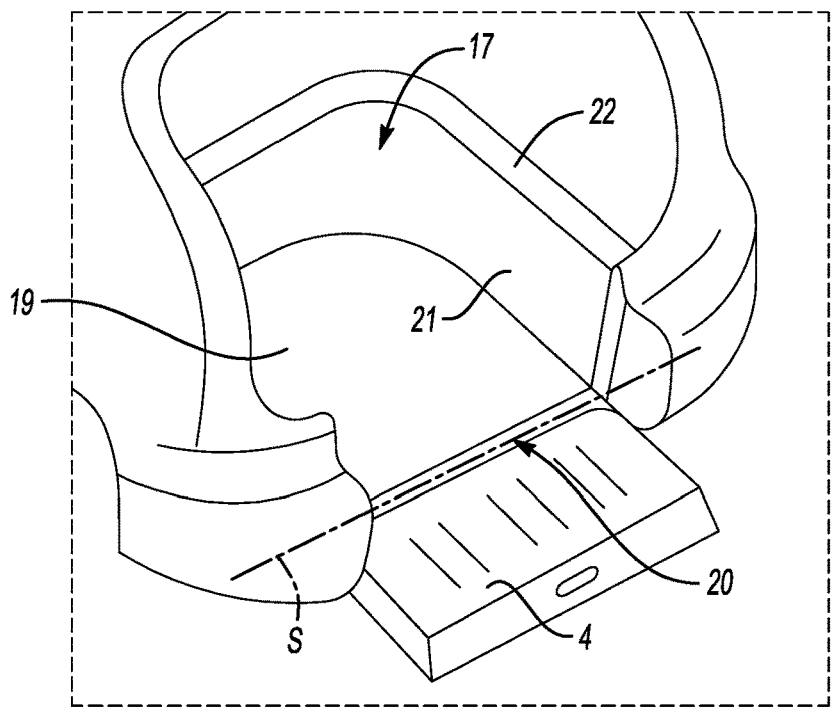
FIG. 4 shows a perspective representation of a vehicle tail with a partially pivoted-away tail assembly according to another exemplary aspect of the present disclosure.

FIG. 3 and FIG. 4 furthermore show that the motor vehicle 2 according to the exemplary embodiment has a cargo tray 17 in the region of the tail-side vehicle trunk. Here, cargo tray 17 is fastened detachably to the vehicle body. In the mounted state, an encompassing element 18 which is of identical design to the basic form of frame element 3 can be arranged below cargo tray 17 and be fastened with its end portions to the vehicle body. In particular, encompassing element 18 can bear with its center portion extending transverse to longitudinal direction of the vehicle L against an underside of cargo tray 17 which faces a driving or stationary ground surface.

In relation to cargo tray 17, it should be mentioned (see also FIGS. 3 and 4) that it has a cargo tray base 19 which is fully delimited with respect to the vehicle by a wall 21—apart from a tray side 20 which faces the vehicle tail. At the tail-side, cargo tray base 19 terminates flush with center portion 6 of frame element 3, therefore lies on approximately the same vertical level (cf. FIG. 3). The cargo tray 17 can be integrated into the base of the vehicle body or provide a part of the vehicle body. As a result of such a configuration, the trunk volume of the vehicle is significantly increased and loading processes are simplified.

As FIGS. 3 and 4 furthermore show in their combined view, angled fastening flanges 22 can be provided in the upper region of cargo tray 17, at an angle to side wall 21 of cargo tray 17, via which fastening flanges 22 cargo tray 17 can be mounted on fastening regions provided on the vehicle side. Fastening flanges 22 can be formed as a continuous fastening flange 22. Fastening flanges 22 can furthermore have fastening openings or fastening means which interact with associated vehicle-side fastening openings or fastening means and can provide a fastening of cargo tray 17 to the vehicle. For example, cargo tray 17 can be screwed to the vehicle, which can in principle also be performed by screw connections in cargo tray base 19. Cargo tray base 19 can also be screwed with encompassing element 18 and frame element 3. As a result of the detachable fastening of cargo tray 17, this can be replaced where necessary.

The tailgate 4 is shown in FIG. 4 in a partially pivoted-out position. The pivoting process is performed about a pivoting axis S. As is apparent from FIG. 5, tailgate 4 can be pivoted out yet further than illustrated in FIG. 4.

Figure 5:
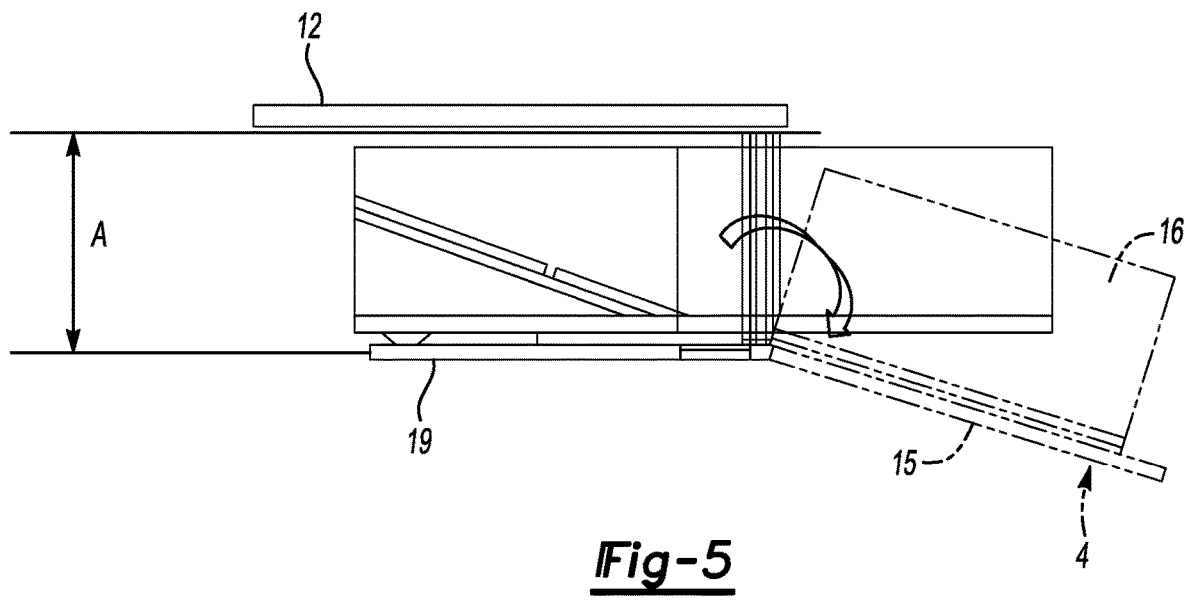
FIG. 5 shows a schematic representation of the mode of operation of a ramp provided by means of the modular tail assembly according to the invention in the pivoted-away state.

As furthermore represented in FIG. 5, tailgate 4 forms a ramp 15 in its pivoted-out position. The ramp 15 forms, in the sense of a loading ramp, a connection between the vehicle interior (in the tail region) and a carriageway surface. Cargo or loads 16 can easily be moved and loaded via ramp 15 into the storage space or tail-side trunk. Ramp 15 can be composed of at least two ramp elements which are telescopically displaceable relative to one another, which ramp elements jointly form a part of tailgate 4 or are integrated into it. Loads 16 can be loaded in a particularly practicable manner into cargo tray 17 via ramp 15. The same applies to unloading processes.

The embodiments of the present disclosure can facilitate simple loading and unloading of storage space provided below a conventional trunk base 12, which storage space is accessible at the tail-side as a result of the provision of the cargo tray 17 and the tail assembly 1. The gain in terms of storage space which can be obtained in this manner is represented, among other things, by distance A between the cargo tray base 19 and the conventional trunk base 12 represented in FIGS. 5.

Advantageous configurations and variants of the exemplary embodiments can be found in the claims below. The features set out individually in the claims can be combined with one another, in any technically useful manner and present other advantageous variant embodiments.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A modular tail assembly for a motor vehicle, comprising:
    a frame element;
    a tailgate; and
    a tail-side vehicle frame delimiting a loading opening, the tail-side vehicle frame extending about an entire circumferential perimeter of the loading opening such that the tail-side vehicle frame encircles the loading opening, the frame element configured to form a part of the tail-side vehicle frame, the frame element detachably fastened to another part of the tail-side vehicle frame.

2. The modular tail assembly of claim 1, wherein the frame element is formed to be U-shaped and has a center portion extending transverse to the longitudinal direction of the vehicle, wherein the frame element includes end portions at opposing ends of the center portion, the end portions each arranged at an angle to the center portion.

3. The modular tail assembly of claim 2, wherein the end portions and the center portion form a one-piece component.

4. The modular tail assembly of claim 2, wherein the tailgate is configured to be pivoted about a pivot axis that runs transverse to the longitudinal direction of the vehicle and is arranged at the height of the center portion.

5. The modular tail assembly of claim 1, wherein the tailgate is configured to be opened by way of a combined translational and pivoting movement.

6. The modular tail assembly of claim 1, further comprising at least one of a bumper, a casing body, at least one seal arrangement, a light source, a sensor element, or a locking mechanism for locking the tailgate on the motor vehicle.

7. The modular tail assembly of claim 1, further comprising a distance sensor as a sensor element.

8. The modular tail assembly of claim 1, wherein the modular tail assembly is composed of several modules.

9. The modular tail assembly of claim 1, wherein the tailgate is moveable to a pivoted-out position, wherein the tailgate forms a ramp when in the pivoted-out position.

10. The modular tail assembly of claim 9, wherein the tailgate is composed of at least two ramp elements which are telescopically displaceable relative to one another.

11. A motor vehicle having the modular tail assembly of claim 1, wherein the motor vehicle has a vehicle body which is formed so that a cargo tray is arranged in the region of a tail-side vehicle trunk.

12. The motor vehicle of claim 11, wherein the cargo tray is fastened detachably to the vehicle body.

13. A modular tail assembly for a motor vehicle, comprising:
    a frame element;
    a tailgate;
    a tail-side vehicle frame delimiting a loading opening, the frame element configured to form a part of the tail-side vehicle frame, the frame element detachably fastened to another part of the tail-side vehicle frame,
    wherein the motor vehicle has a vehicle body which is formed so that a cargo tray is arranged in the region of a tail-side vehicle trunk,
    wherein the cargo tray is fastened detachably to the vehicle body; and
    at least one encompassing element arranged below the cargo tray, the at least one encompassing element having end portions that fasten to the vehicle body.

14. The motor vehicle of claim 13, wherein the at least one encompassing element that is nominally identical design to the basic form of the frame element.

15. The motor vehicle of claim 13, wherein the encompassing element at least partially encompasses the cargo tray on an underside of the cargo tray.

16. The motor vehicle of claim 13, wherein the encompassing element bears with its center portion extending transverse to the longitudinal direction of the vehicle against an underside of the cargo tray which faces a driving or stationary ground surface.

17. A modular tail assembly for a motor vehicle, comprising:
    a tail-side vehicle frame that delimits a loading opening to a motor vehicle, the tail-side vehicle frame extending circumferentially about an entire perimeter of the loading opening;
    a frame element of a vehicle frame, the frame element detachably fastened to another part of the vehicle frame, the frame element having a center portion, a first end portion, and a second end portion, the center portion configured to extend transverse to a longitudinal direction of a vehicle, the first and second end portions disposed at opposing ends of the center portion, the first and second end portions extending upwardly from the center portion;
    a cargo tray arranged in a region of a tail-side vehicle trunk, the cargo tray arranged above a height of the center portion of the frame element; and
    a tailgate configured to be pivoted about a pivot axis that runs transverse to the longitudinal direction of the vehicle and is arranged at the height of the center portion of the frame element.

18. The modular tail assembly of claim 17, wherein the tailgate is moveable to a pivoted-out position, wherein the tailgate forms a ramp when in the pivoted-out position.

19. The modular tail assembly of claim 18, wherein the tailgate is composed of at least two ramp elements which are telescopically displaceable relative to one another.

* * * * *